UNITED STATES PATENT OFFICE.

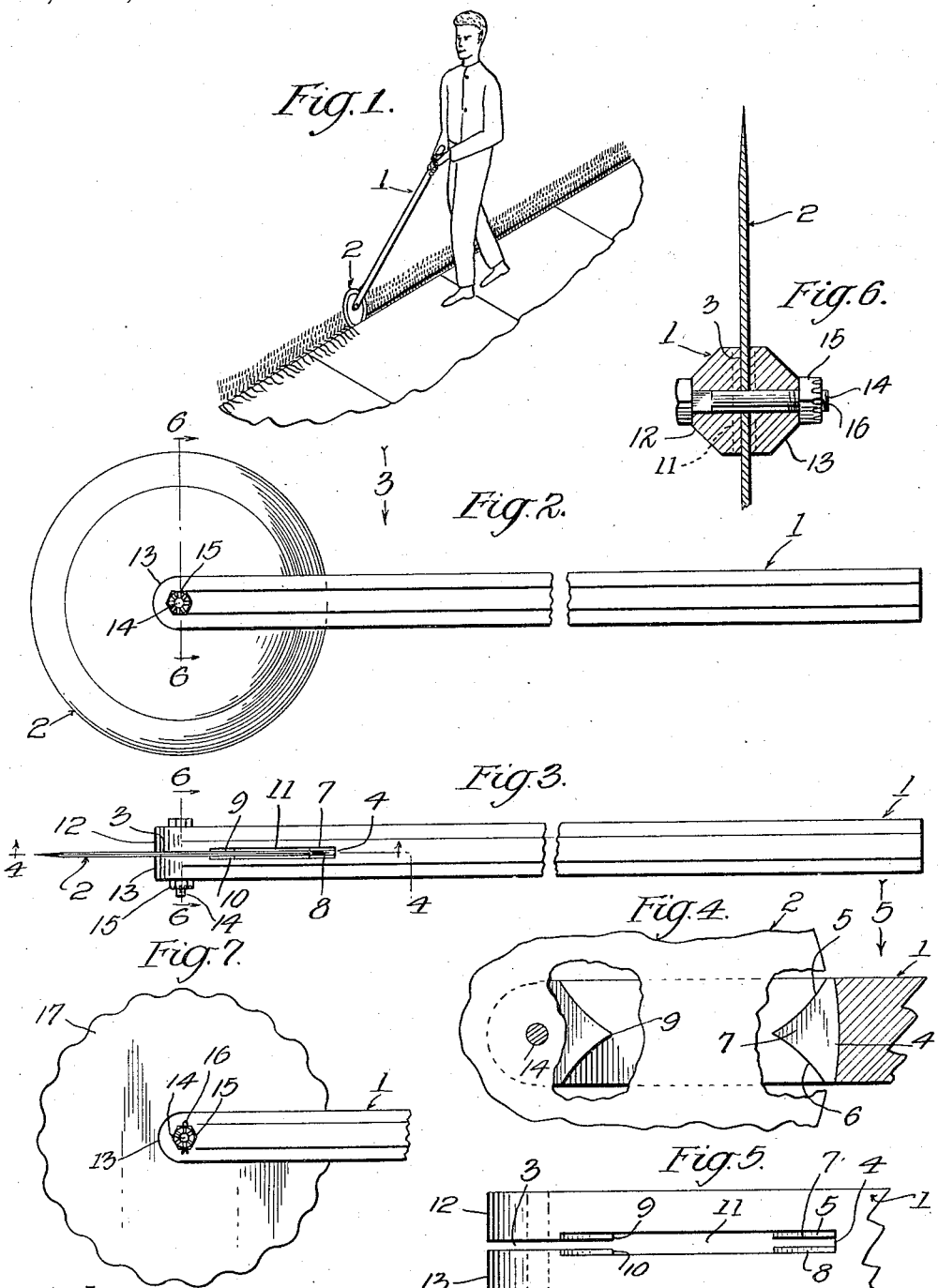

CALEB A. ISAACS, OF LOS ANGELES, CALIFORNIA.

LAWN-EDGER.

1,152,093.  Specification of Letters Patent.  Patented Aug. 31, 1915.

Application filed March 24, 1915. Serial No. 16,600.

*To all whom it may concern:*

Be it known that I, CALEB A. ISAACS, a citizen of the United States, residing at Los Angeles, in the county of Los Angeles and State of California, have invented a new and useful Lawn-Edger, of which the following is a specification.

My object is to make a simple device for trimming the edge of the lawn, as where the grass grows over on to the sidewalk, and my invention consists of the novel features herein shown, described and claimed.

Figure 1 is a perspective, showing my lawn edger in use. Fig. 2 is a side elevation of the lawn edger. Fig. 3 is an edge view as seen looking in the direction indicated by the arrow 3 in Fig. 2. Fig. 4 is an enlarged fragmentary sectional detail upon the line 4—4 of Fig. 3. Fig. 5 is a fragmentary plan view of the handle or frame upon an enlarged scale upon the same plane as Fig. 3 and as seen looking in the direction indicated by the arrow 5 in Fig. 4 with the rolling cutter omitted. Fig. 6 is an enlarged sectional detail on the line 6—6 of Figs. 2 and 3. Fig. 7 is a view analogous to Fig. 2 and showing a modified form of the rolling cutter.

The operating handle or frame 1 is a wooden bar, preferably about five feet long and one and three quarter inches in cross section and eight sided.

The rolling cutter 2 is a disk of sheet metal, preferably about eight or ten inches in diameter of uniform thickness throughout its body and sharpened on the edge.

A slot 3 is formed in one end of the handle 1, said slot being simply a saw-cut made with a saw equal to the thickness of the disk 2 and said slot extending into the handle 1 to the line 4, that is: far enough to allow of mounting the disk or roll cutter 2. In order to make a clearance for that part of the cutter 2 between the central portion and the edge, a saw-cut 5 is made from one side of the handle 1 and a similar recess 6 is made from the other side of the handle 1, said recesses 5 and 6 being made with thicker saws than the slot 3 and the saws being operated in the same plane as the saw making the slot 3 so that the clearance will be equally divided upon both sides of the cutter.

In making the recesses 5 and 6, triangular projections 7 and 8 extend from the line 4 upon each side of the slot 3 and similar triangular projections 9 and 10 extend from the opposite sides of the clearance space 11, said triangular projections being located one at each end of the recesses 5 and 6, and the apexes of the projections facing each other.

The cutter 2 is mounted in the slot 3 and fits closely between the bearing portions 12 and 13 of the handle 1. A bolt 14, preferably a carriage bolt, is inserted through the bearing portions 12 and 13 and through the cutter 2 to form an axle. A keyed nut 15 is adjustably mounted upon the screw threaded end of the bolt, so that by manipulating the nut 15, the bearing portions 12 and 13 may be drawn together to fit the cutter 2 and so that as the wearing faces of the bearing portions 12 and 13 wear away, further manipulation of the nut 15 will tighten the bearing portions against the disk. A spring cotter 16 is inserted through the end of the bolt to engage in the slots in the nut 15 and hold the nut from unscrewing.

The faces of the projections 7, 8, 9 and 10 are inclined relative to a radial line drawn from the bolt 14 and said inclined surfaces serve as shovels to clean the cutter, and the edge of the cutter operates in the slot 3 between the projections 7 and 8, thereby keeping the edge of the cutter clean.

The cutter 2, shown in Figs. 2 and 3, has a smooth edge, whereas the cutter 17, shown in Fig. 7, has a scalloped edge. It is thought that in some cases the scalloped edge will be better than the smooth edge in gripping the sod and causing the cutter to rotate.

The details of construction may be varied in many ways without departing from the spirit of my invention, as set up in the following claim.

I claim:

A lawn edger, comprising a bar having a slot extending from one end and having a bore extending transversely of the slot, a disk cutter fitting in the slot, a bolt extending through the bore and through the disk cutter, and means for tightening the bolt to draw the two portions of the bar against the disk cutter to take up the wear, there being opposed clearance spaces on both sides of the disk formed by corresponding recesses cut in the opposed faces of the slot, each recess extending on opposite sides of the bore and terminating in triangular projections, the apexes of which face each other, thereby forming cleaners for the disk.

CALEB A. ISAACS.

Witnesses:
SEMER G. WELLS,
GRACE DODGE NAQUIN.

Copies of this patent may be obtained for five cents each, by addressing the "Commissioner of Patents, Washington, D. C."